(12) United States Patent
Aldridge, III

(10) Patent No.: US 7,913,446 B1
(45) Date of Patent: Mar. 29, 2011

(54) FISHING TACKLE AND LURE HOLDER

(76) Inventor: James K. Aldridge, III, La Grange, NC (US)

( * ) Notice: Subject to any disclaimer, the term of this patent is extended or adjusted under 35 U.S.C. 154(b) by 357 days.

(21) Appl. No.: 10/838,828

(22) Filed: May 4, 2004

(51) Int. Cl.
*A01K 97/06* (2006.01)
(52) U.S. Cl. ........................................... 43/57.1; 43/54.1
(58) Field of Classification Search ............... 43/57.1, 43/57.2, 54.1; 206/315.11
See application file for complete search history.

(56) References Cited

U.S. PATENT DOCUMENTS

| | | | | |
|---|---|---|---|---|
| 4,067,607 A | * | 1/1978 | Battles | 312/235.2 |
| 4,757,636 A | * | 7/1988 | Lambourn | 43/57 |
| 4,826,007 A | * | 5/1989 | Skeie | 206/373 |
| 5,303,500 A | * | 4/1994 | Luukonen | 43/54.1 |
| 5,350,065 A | * | 9/1994 | Darrey | 206/373 |
| 5,782,200 A | * | 7/1998 | Knowles et al. | 119/53 |
| 5,802,760 A | * | 9/1998 | Campbell | 43/57 |
| 6,357,169 B1 | * | 3/2002 | Gouge | 43/56 |

OTHER PUBLICATIONS

Definition of the term "base" from Dictionary.com.*

* cited by examiner

*Primary Examiner* — T. Nguyen
(74) *Attorney, Agent, or Firm* — Coats & Bennett PLLC

(57) ABSTRACT

A fishing tackle and lure holder is provided wherein the holder comprises a cylindrical sleeve having upper and lower open ends. A base is detachably secured to the lower end of the sleeve. The diameter of the base is greater than the diameter of the sleeve such that the base extends outwardly from the sleeve to provide a stable support for the sleeve. An array of hook apertures are formed into the upper portion of the sleeve. Specifically, at least two sets of hook apertures are formed or cut into the upper portion of the sleeve. Each hook aperture is designed to receive and hold a hook associated with a fishing tackle or a lure. This will permit a series of fishing tackle and lures to be suspended in an organized fashion around the sleeve of the holder.

16 Claims, 4 Drawing Sheets

FISHING TACKLE AND LURE HOLDER

FIELD OF THE INVENTION

The present invention relates to fishing tackle and fishing lures and more particularly to a support structure for receiving and holding fishing tackle and fishing lures in a suspended and organized manner around the support structure.

BACKGROUND OF THE INVENTION

Deep-sea or offshore fishing has, over the years, become a very popular sport. While there are various types of deep sea fishing, some fishermen travel as much as 40 to 50 miles offshore to an area known as the gulf stream where fish of all types are more plentiful than other areas along the shore.

People that fish regularly are often skilled and experienced and this skill and experience is often reflected in the productivity of fishermen. Deep-sea fishermen spend substantial time planning and preparing for fishing trips. That is, they purchase a variety of fishing tackle and fishing lures and spend time prior to departing rigging and organizing fishing tackle and lures. It is important that the various fishing tackle and lures utilized by fishermen be organized and be carried and supported by a device that makes them easy to retrieve while at sea. Time can be wasted when a school of fish are encountered and yet the fishing lures and tackle of the fishermen are tangled, disorganized and not kept in a manner that enables them to be quickly and easily retrieved and appropriately connected to a spinning reel.

There are devices known which receive and hold fishing lures and fishing tackle. These devices are used on boats and are adapted to receive and hold multiple lures and tackle. For example, it is known to use a bucket on board to receive and hold a variety of fishing tackle and lures. These are conventional plastic buckets with a bottom and an upper opening defined by a rim. The rim can be notched so as to form a series of V-shaped receiving points around the top of the bucket. The hooks of fishing lures and tackle can be laid into the bottom of the V-shaped slots, allowing the fishing lures and tackle to be suspended therefrom. However, these types of devices have a number of drawbacks. One of the principal drawbacks is that these devices are very unstable on a boat and are especially unstable in rough seas. Often in rough seas these buckets will turn over and the various fishing lures and tackle supported thereon become tangled and intermixed. Hence, time is required to separate the various fishing tackle and lures and to reorganize them around the upper rim of the bucket.

Therefore, there has been and continues to be a need for a device for receiving and holding fishing tackle and lures that is stable and will generally remain upright on the floor of a boat even during relatively rough seas.

SUMMARY OF THE INVENTION

The present invention entails a fishing tackle and lure holder for holding a series of fishing tackle and lures in an organized manner. The holder comprises a sleeve having an interior surface and an exterior surface. A base is provided that supports the sleeve. The base is sized such that the base extends outwardly from the sleeve thereby providing stability to the sleeve. Further, there is provided an array of fishing tackle and lure receivers formed around the sleeve for receiving and holding individual fishing tackle and lures.

In one particular embodiment, the sleeve assumes a generally cylindrical shape. Likewise the base is of a generally cylindrical shape. However, the diameter of the base exceeds the diameter of the sleeve such that when the base is secured to the sleeve, the base provides additional stability.

In another particular embodiment of the present invention, the fishing tackle and lure holder is provided with multiple arrays of apertures or receivers. Each array extends around the holder in a selected fashion. For example, an array of apertures or receivers can be formed or placed around the upper portion of the sleeve. Further, as another option, an annular rim can be secured to the top of the sleeve and apertures or receivers can be formed therein.

The present invention also entails a method of manufacturing a holder for fishing tackle and lures. The method includes beginning with a bucket having a cylindrical wall and having a bottom. The method entails cutting out at least a portion of the bottom of the bucket so as to form a cylindrical sleeve having upper and lower open areas. The method further includes providing a base for the formed sleeve. Finally, a series of hook apertures or receivers are formed or cut into the formed sleeve or into an annular rim that can be secured to the sleeve.

Other objects and advantages of the present invention will become apparent and obvious from a study of the following description and the accompanying drawings which are merely illustrative of such invention.

DESCRIPTION OF THE INVENTION

With further reference to the drawings, a fishing tackle and lure support device is shown therein and indicated generally by the numeral 10. As will be appreciated from subsequent portions of this disclosure, the support 10 functions to receive and hold fishing tackle and lures, and to maintain the fishing tackle and lures in an organized manner such that they can be accessed and retrieved quickly and conveniently.

Figure 3:
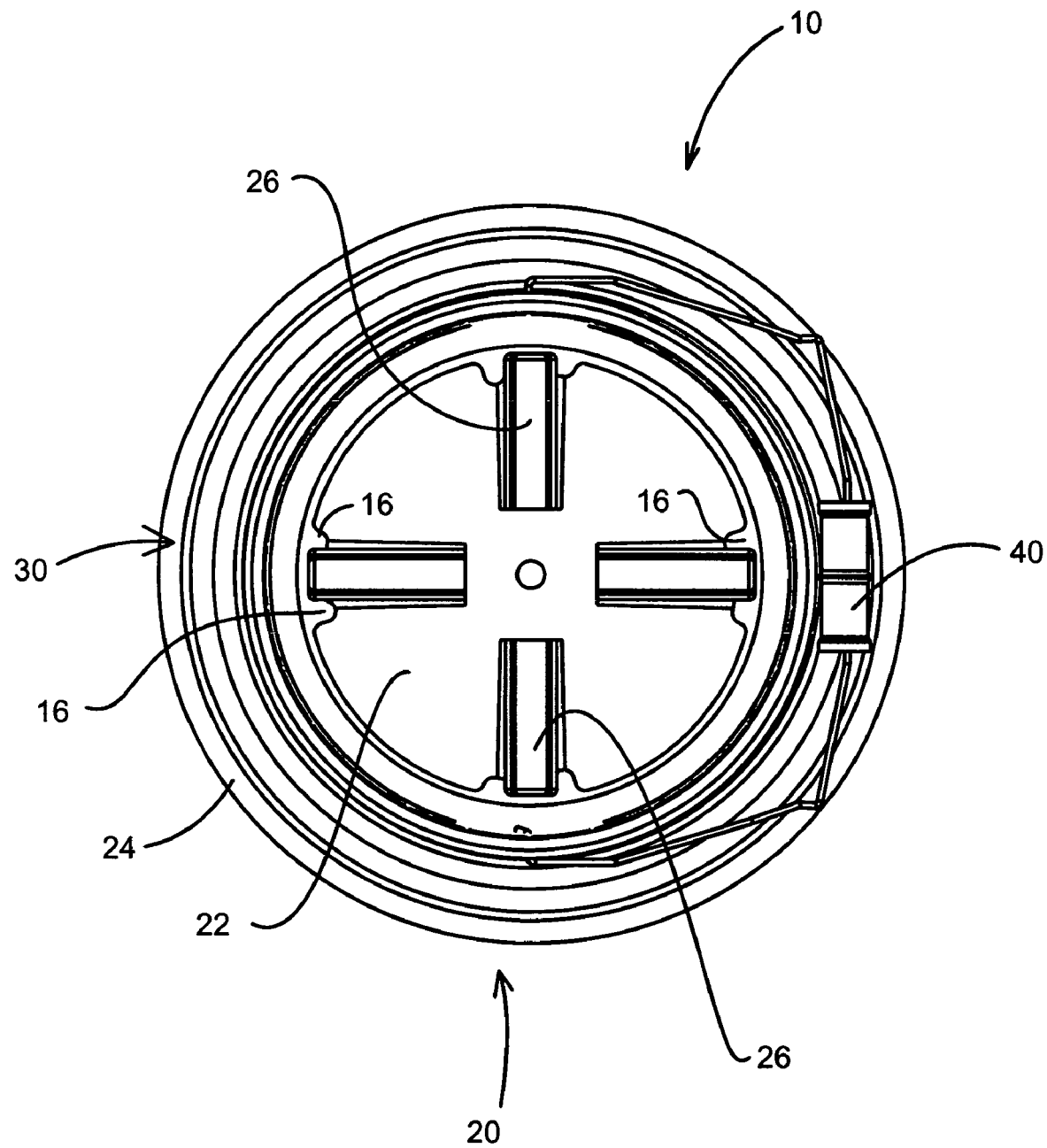
FIG. 3 is a top plan view of the fishing tackle and lure holder with the top annular rim of the device removed to better illustrate portions of the base.

Turning now to a description of the fishing tackle and lure support 10, the same includes a sleeve indicated generally by the numeral 12. Sleeve 12 in the embodiment illustrated herein is of a cylindrical design and includes a surrounding wall 14. Sleeve 12 is open at the top and bottom. About the bottom or lower portion of the sleeve 12 there is provided a series of inwardly projecting tabs 16. This is best illustrated in FIG. 3. As seen therein, tabs 16 project a short distance inwardly from the lower terminal edge of the sleeve. Tabs 16, as will be understood from subsequent portions of this disclosure, function to connect the sleeve 12 to an underlying support structure.

Disposed below the sleeve 12 is a base indicated generally by the numeral 20. Base 20 is designed, in the case of this embodiment, to be detachably secured to the sleeve 12. It will be understood and appreciated, that the base 20 need not be designed so as to be detachably securable to the sleeve 12. In any event, base 20 includes a generally flat bottom 22 and a surrounding wall 24. Disposed on the bottom 22 and projecting upwardly therefrom are a series of circumferentially spaced supports 26. Each support includes an outer edge that has a slot formed therein. The slots of supports 26 function to receive the respective tabs 16 of the sleeve. That is, the tabs 16 can be turned into the slots formed in the supports 26 and the engagement of the tabs within the slots will effectively secure the sleeve 12 to the base.

Figure 1:
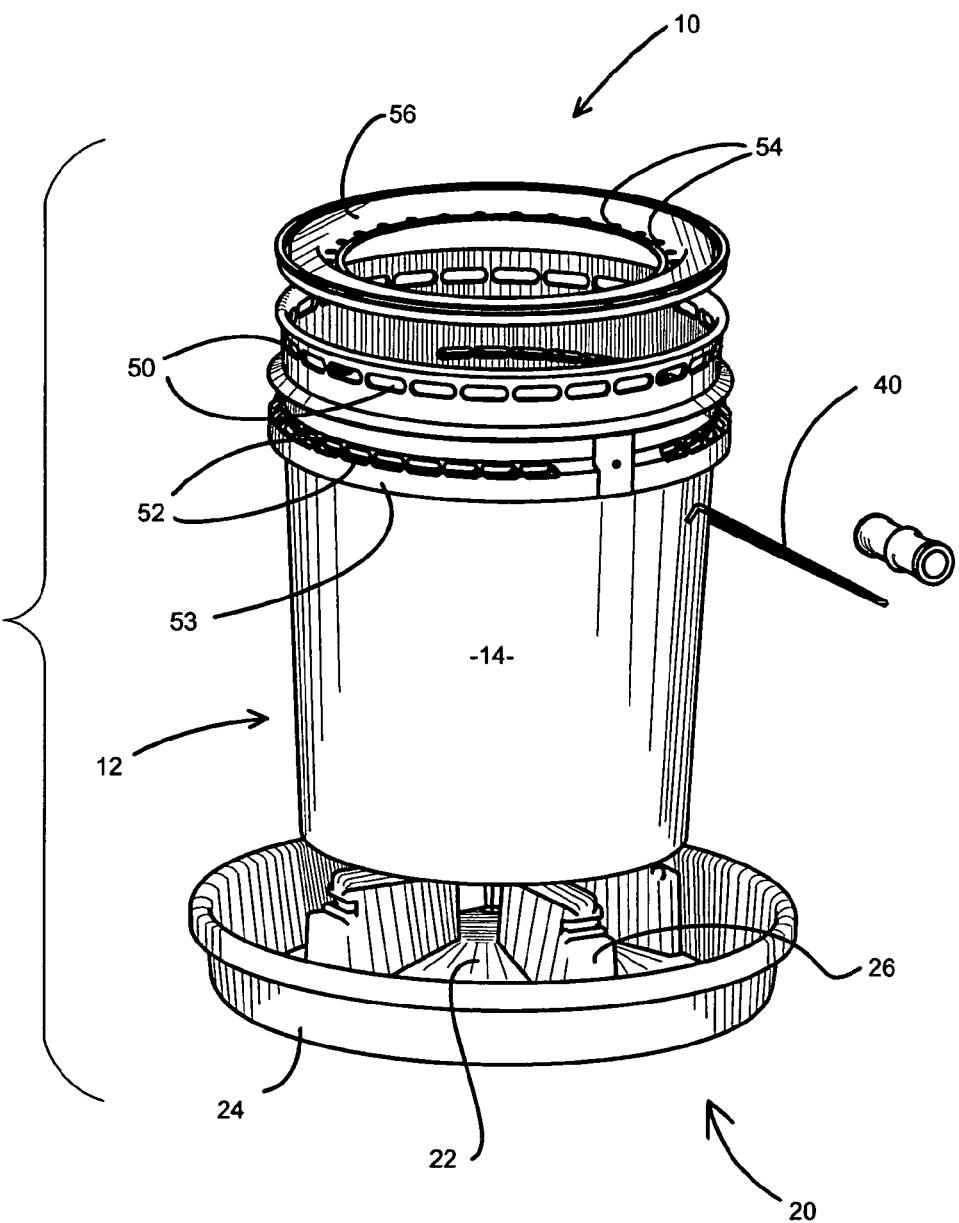
FIG. 1 is an exploded perspective view of the fishing tackle and lure holder of the present invention.

Base 20 forms a surrounding tray that extends adjacent the lower portion of the sleeve 12. This tray is indicated generally by the numeral 30. As seen in FIG. 1, the tray 30 projects outwardly from the sleeve and forms an area for holding supplies and equipment such as pliers, knives, additional hooks and lines and other fishing related supplies or paraphernalia. Other types of base designs may be employed. For example, the device could be provided with a pair of cross members that extend outwardly from the bottom of the sleeve. Alternatively the device could be provided with a series of shoes or supports that would project outwardly from the bottom portion of the sleeve.

Base 20 functions to add stability to the sleeve 12. That is, the diameter of the base 20 exceeds the diameter of the sleeve 12. As seen in the drawings, base 20 projects outwardly from the sleeve 12. This will, of course, add additional stability compared to a design that simply relies on the sleeve to stable itself. It is appreciated that the fishing tackle and lure holder or device 10 is designed to be utilized on board a fishing vessel. This means that the base 12 will ordinarily sit on the floor or other support structure within a boat. When the boat rocks back and forth, for example in rough seas, the base 20 will provide adequate support for the sleeve and the fishing tackle and lure device 10 will generally resist tipping over.

The fishing tackle and lure holder 10 is designed to be portable and to be carried to and from a fishing vessel. In order to facilitate the portability of this device and to make carrying easy, the device is provided with a handle 40. Note that the handle 40 is pivotally connected into the wall 14 of the sleeve and can be rotated from the position shown in FIG. 1 to an upright holding position.

The device 10 functions to receive and hold fishing tackle and lures. To accommodate this function, the device is provided with an array of apertures or hook receivers for receiving and retaining one or more hooks associated with a fishing tackle or a fishing lure. Herein the terms aperture and hook receiver are meant to mean the same and to be interchangeable. The term aperture or hook receiver simply means a structure that will receive a hook of a fishing tackle or lure and hold the same such that the lure can be suspended or supported by the aperture or hook receiver.

In the case of the fishing tackle and lure support device 10, the same includes an array of apertures or hook receivers. There is a first array of apertures formed along the upper portion of the sleeve 12. This first array of apertures is referred to by the numeral 50. Note that the first array of apertures 50 includes a series of side-by-side elongated openings that are formed in the upper portion of the sleeve 12. The individual apertures or hook receivers 50 that form the first array extend circumferentially around the entire or substantial portion of the sleeve.

Figure 4:
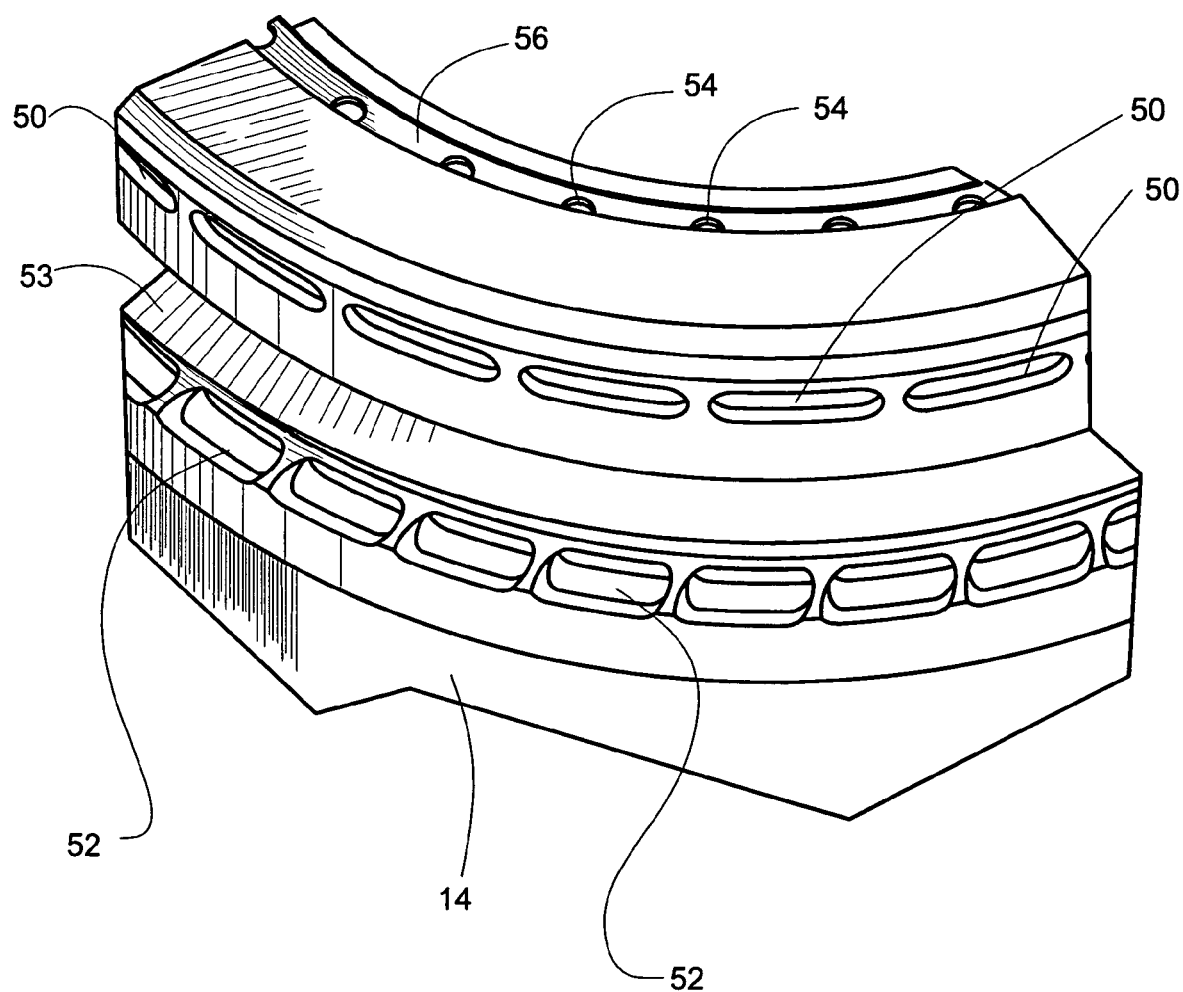
FIG. 4 is a fragmentary perspective view showing a portion of the wall structure of the sleeve with the various apertures formed therein.

Spaced below the first array of apertures or hook receivers is a second array of apertures or hook receivers. The second array of apertures or hook receivers is referred to by the numeral 52. In this particular embodiment, the sleeve is provided with a circumferential rib 53 that extends around the sleeve 12 about the outer surface thereof. This circumferential rib adds rigidity to the sleeve. In the case of this embodiment the circumferential rib 53 includes a portion that projects outwardly from the wall 14 of the sleeve 12. It is in this portion of the circumferential rib 53 that the array of apertures or hook receivers 52 is formed. This is particularly illustrated in FIG. 4. Again, the apertures or hook receivers 52 are elongated and extend substantially around the sleeve 12.

A third array of apertures or hook receivers is also provided. The third array of apertures or hook receivers is referred to by the numeral 54. This third array of apertures or hook receivers 54 is made possible through an annular rim 56. Annular rim 56 is adapted to be detachably secured to the top portion of the sleeve 12. Annular rim 56 can be detachably secured in various ways. In one embodiment, it is contemplated that the annular rim 56 would include a groove that would snap on to the upper edge of the sleeve 12 in the same fashion that the top of a plastic bucket would snap on to the upper edge of the surrounding wall structure of the bucket. In any event, the third array of apertures or hook receivers 54 is formed in the annular rim 56. This is particularly illustrated in FIGS. 1, 2 and 4. Note that the third array of apertures 54 is disposed inwardly of the wall 14. Thus, when hooks of fishing tackle and lures are hooked into the third array of apertures 54 it follows that the fishing tackle and lures are suspended interiorly of the wall 14 of the sleeve. This will, of course, separate these fishing tackle and lures from those that would be suspended from the apertures of the first and second arrays of apertures or hook receivers.

Figure 2:
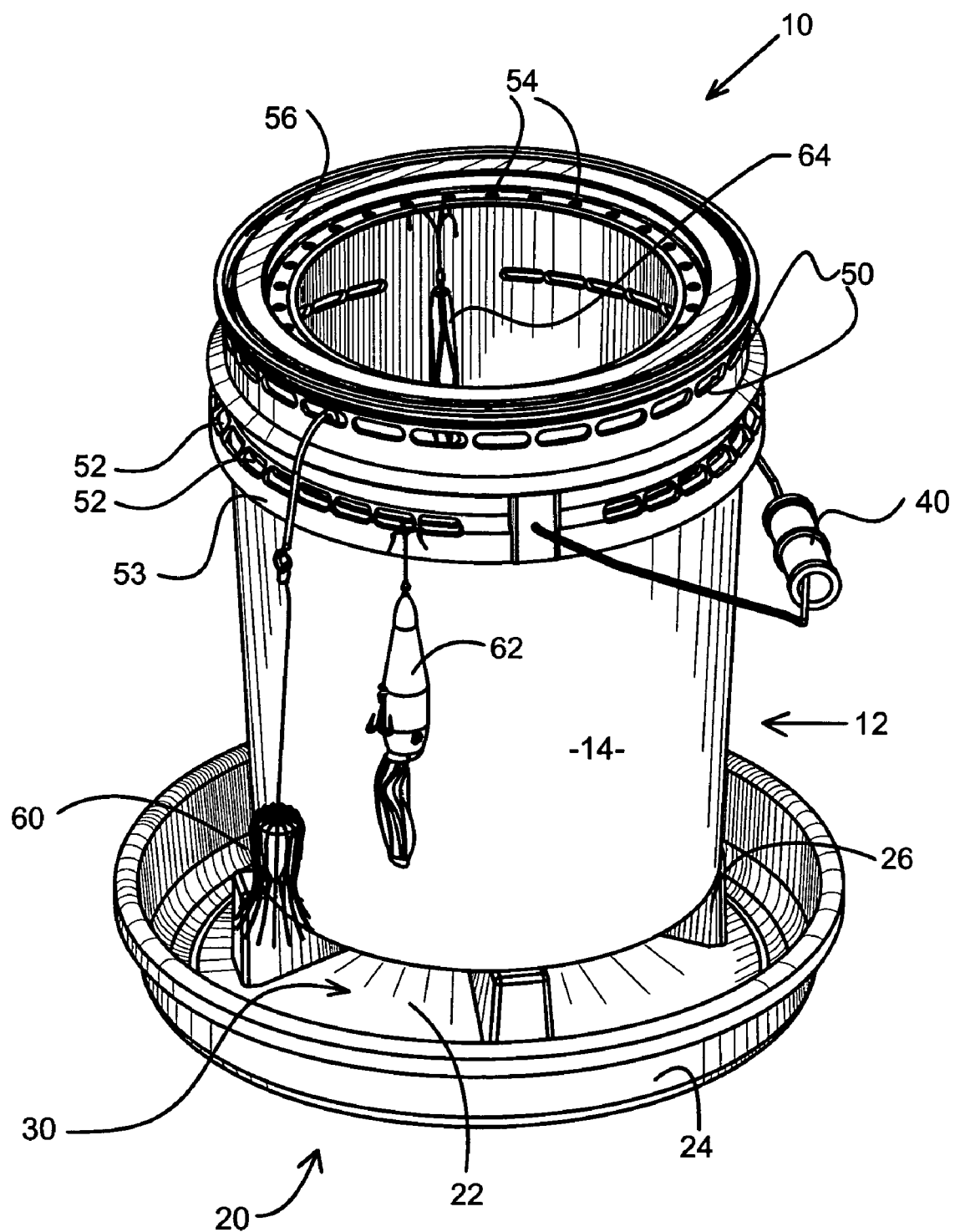
FIG. 2 is a perspective view of the fishing tackle and lure holder of the present invention showing the sleeve attached to the base.

For purposes of explanation, three different fishing lures are shown in the drawings (FIG. 2). These include fishing lure 60, fishing lure 62 and fishing lure 64. Fishing lure 60 is shown suspended from one of the apertures 50 found in the first array. Note that the hook of lure 60 is simply hooked into the aperture and that the fishing lure 60 is simply suspended along the outer surface of the wall 14 of the sleeve. Fishing lure 62, on the other hand, is suspended from one of the apertures 52 of the second array. Note again where fishing lure 62 is simply suspended along the outer surface of the surrounding wall 14 of the sleeve 12. Finally, the third fishing lure 64 is suspended from an aperture 54 of the third array. This fishing lure effectively hangs or is suspended along the interior wall 14 of the sleeve 12.

The fishing tackle and lure support device 10 can be constructed in various ways and from various materials. In one embodiment, it is contemplated that the device would be of a plastic construction. With respect to manufacturing the fishing tackle and lure support device 10, it is contemplated that the process can begin with obtaining commercially made plastic five gallon buckets. The bottom of these buckets can be cut out in such a fashion that the cut-out leaves the tabs 16 projecting inwardly as illustrated in FIG. 3. Some plastic buckets may include a circumferential rib such as the rib 53 shown in the drawings. In some cases these circumferential ribs will project outwardly from the wall of the bucket. Consequently, apertures or hook receivers can simply be cut into the rib of the bucket. This would, of course, form the second array of apertures 52. About the upper rim or edge of the bucket, additional apertures can be cut circumferentially around the top of the bucket. This would form the first set of apertures 50. Other products are known to have been made from buckets. For example, U.S. Pat. No. 5,699,753 is directed to an animal feeder, and the upper housing of the animal feeder can be constructed from a bucket.

Finally, some five gallon plastic buckets are provided with a snap-on plastic top. The plastic top of these buckets can be machined or cut so as to form the annular rim 56. Once the annular rim has been machined or formed, then the third array of apertures 54 can be cut therein.

Various bases can be utilized. In the case of the embodiment illustrated herein, the base 20 would be designed and molded to receive the tabs 16. Of course many other designs and means can be provided for making the base detachably secured to the sleeve 12. As pointed out above, however, the base need not be detachably secured to the sleeve.

The fishing tackle and lure holding device of the present invention has many advantages. First its design makes the device as a whole very stable even when disposed on the floor of a fishing vessel at rough seas. The base in this case has a diameter that exceeds that diameter of the sleeve and that increased diameter makes the unit, as a whole, more stable. In addition, the multiple arrays of apertures or hook receivers for holding and organizing many different fishing tackle and lures enable fishermen to easily and conveniently carry all of their fishing lures to and from a fishing vessel. In addition, once on the fishing vessel, the support 10 maintains the fishermen's fishing tackle and lures in an organized configuration with the individual tackle and lures being separated and being disposed such that they can be easily accessed and retrieved.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A fishing tackle and lure holder for holding fishing tackle and lures comprising:
    a. a sleeve is cylindrical and having an interior surface, an exterior surface, an open top, and bottom;
    b. a base that forms the bottom of the fishing tackle and lure holder and which supports the fishing tackle and lure holder;
    c. the base being sized such that the base extends substantially outwardly from the sleeve so as to provide a stable bottom for the fishing tackle and lure holder; and
    d. an array of fishing tackle or fishing lure receivers formed around the sleeve for receiving and holding fishing lures; and wherein the array of fishing tackle or fishing lure receivers includes: a first set of hook apertures formed into an upper portion of the sleeve and extending around the sleeve, a second set of hook apertures formed in the sleeve and extending around the sleeve; and an annular top panel secured on top of the open top of the sleeve and forming an opening in the top of the holder and wherein there is provided a third set of hook apertures formed in the annular top that permit fishing tackle and fishing lures to hang from the third set of apertures and into an interior area of the cylindrical sleeve.

2. The fishing tackle and lure holder of claim 1 wherein the base is detachable secured to the sleeve.

3. The fishing tackle and lure holder of claim 1 wherein the base forms a tray around the holder.

4. The fishing tackle and lure holder of claim 3 wherein the sleeve includes a cylindrical sleeve having a lower terminal edge and wherein the formed tray lies generally below the lower terminal edge of the sleeve and is formed in the base.

5. The fishing tackle and lure holder of claim 1 wherein both the sleeve and the base are generally cylindrically shaped and wherein the diameter of the base exceeds the diameter of the sleeve such that the base provides a stable support structure of which the sleeve rests.

6. The fishing tackle and lure holder of claim 1 wherein the array of fishing tackle and lure receivers includes a series of apertures where each aperture is adapted to receive a hook associated with a fishing lure or fishing tackle.

7. The fishing tackle and lure holder of claim 6 wherein the sleeve includes upper and lower portions and wherein the array of apertures for receiving and holding the hooks is disposed about the upper portion of the sleeve.

8. The fishing tackle and lure holder of claim 1 wherein the array of fishing tackle and lure receivers includes at least two sets of hook apertures, each set of hook apertures extending around a portion of the sleeve.

9. The fishing tackle and lure holder of claim 8 including a third set of hook apertures extending around the holder.

10. The fishing tackle and lure holder of claim 1 wherein the base is detachably mounted to the sleeve, and wherein the sleeve includes a lower end and a series of circumferentially spaced tabs that project inwardly from the sleeve; wherein the base includes a series of slots for receiving the tabs and wherein the base may be secured to the sleeve by moving the tabs into the slots.

11. A fishing tackle and lure holder for holding fishing tackle and lures comprising:
    a. an elongated cylindrical sleeve having an outer surface, an inner surface and being generally open at upper and lower ends;
    b. a generally cylindrical base disposed at the lower end of the sleeve;
    c. the base having a diameter greater than the diameter of the sleeve and wherein the base projects substantially outward from the sleeve so as to form a stable support for the sleeve;
    d. at least two sets of hook apertures for receiving a series of fishing tackle or lures, each set of hook apertures being formed in the cylindrical sleeve and extending substantially around and an annular ring disposed on top of the upper end of the sleeve and wherein the annular ring includes a third set of hook apertures former therein and wherein the third set of hook apertures are formed with respect to the sleeve such that when the hooks of a series of fishing tackle and lures are supported by the third set of hook apertures the respective fishing tackle and lures depend downwardly into an interior area of the sleeve.

12. The fishing tackle and lure holder of claim 11 wherein one set of hook apertures is formed into an upper edge of the sleeve.

13. The fishing tackle and lure holder of claim 12 wherein the sleeve includes a reinforcing rib extending around the outer surface of the sleeve and wherein a second set of hook apertures are formed in the rib.

14. The fishing tackle and lure holder of claim 11 wherein the base forms a tray for receiving and holding articles and wherein the tray extends outwardly with respect to the lower end of the sleeve.

15. The fishing tackle and lure holder of claim 14 wherein the tray extends circumferentially around the lower portion of the sleeve.

16. The fishing tackle and lure holder of claim 3 wherein the tray forms an annular opening that extends around the holder and between the sleeve and a wall that forms a part of the base, and wherein the tray forms an annular storage area that extends around the sleeve and is bounded by the wall of the base and a bottom that forms a part of the base.

* * * * *